(12) United States Patent
Monteiro

(10) Patent No.: US 8,696,196 B2
(45) Date of Patent: Apr. 15, 2014

(54) BLEED LEAKAGE DETECTION SYSTEM AND METHOD

(75) Inventor: Oswaldo Barthel Monteiro, Sao Jose dos Campos-SP (BR)

(73) Assignee: Embraer S.A., Sao Jose dos Campos (BR)

( * ) Notice: Subject to any disclaimer, the term of this patent is extended or adjusted under 35 U.S.C. 154(b) by 698 days.

(21) Appl. No.: 12/341,272

(22) Filed: Dec. 22, 2008

(65) Prior Publication Data

US 2010/0158068 A1 Jun. 24, 2010

(51) Int. Cl.
*G01N 25/72* (2006.01)
*G01K 7/16* (2006.01)

(52) U.S. Cl.
USPC ............. 374/4; 374/183; 374/185; 374/57; 374/45

(58) Field of Classification Search
USPC ............ 374/100, 4, 5, 45, 57, 163, 185, 183, 374/141, 147, 148, 29, 137, 110, 11, 112, 374/114, 115, 166, 167, 109, 164, 1; 340/945
See application file for complete search history.

(56) References Cited

U.S. PATENT DOCUMENTS

| | | | | |
|---|---|---|---|---|
| 2,452,942 A * | 11/1948 | Lord et al. | ..................... | 340/524 |
| 2,697,215 A * | 12/1954 | Morris, Jr. | ..................... | 337/332 |
| 2,762,998 A * | 9/1956 | Talbott, Jr. | ..................... | 340/289 |
| 3,741,476 A * | 6/1973 | Travaglio | ..................... | 236/87 |
| 4,194,357 A * | 3/1980 | Matulich et al. | ................ | 60/772 |
| 4,655,607 A * | 4/1987 | Kern et al. | ......................... | 374/4 |
| 4,788,398 A * | 11/1988 | Hornung | ........................ | 219/483 |
| 5,428,206 A * | 6/1995 | Uchida et al. | ................. | 219/505 |
| 6,507,789 B1 | 1/2003 | Reddy et al. | | |
| 6,881,948 B2 * | 4/2005 | Dammann | ............... | 250/227.14 |
| 7,042,240 B2 * | 5/2006 | Lopez et al. | ............. | 324/750.07 |
| 7,171,929 B2 | 2/2007 | Dosdall et al. | | |
| 7,356,438 B2 * | 4/2008 | Schaumann et al. | .......... | 702/130 |
| 7,445,377 B2 * | 11/2008 | Lee et al. | .......................... | 374/5 |
| 7,465,087 B2 * | 12/2008 | Gul | ............................... | 374/147 |
| 7,575,370 B2 * | 8/2009 | Park et al. | ......................... | 374/1 |
| 7,618,008 B2 * | 11/2009 | Scherer et al. | ............ | 244/117 R |
| 8,122,968 B2 * | 2/2012 | Johnson | .......................... | 169/16 |

(Continued)

FOREIGN PATENT DOCUMENTS

WO WO2007134749 A1 11/2007

OTHER PUBLICATIONS

Kourti, Theodora, et al., "Process analysis, monitoring and diagnosis, using multivariate projection methods," Chemometrics and Intelligent Laboratory Systems 28, 3-21 (1995).

(Continued)

*Primary Examiner* — Gail Verbitsky
(74) *Attorney, Agent, or Firm* — Nixon & Vanderhye P.C.

(57) ABSTRACT

A bleed leakage detection system includes an arrangement of thermostats that are capable of detecting the place where the bleed air leakage is occurring (e.g., the failed junction in bleed air duct work). The exemplary illustrative non-limiting implementation provides a bleed leakage detection system with continuous monitoring of thermostat sensor wiring during flight and thermostat self-test function ("Initiated Built In Test"—"IBIT"). The IBIT self-testing can be initiated before the aircraft takes off or optionally, during periodic self testing that may be run during predetermined periods such as overnight when the aircraft is not being flown. By the continuous monitoring the pilot is alerted when a bleed leakage has occurred or when the bleed leakage detection system has failed.

15 Claims, 10 Drawing Sheets

(56) References Cited

U.S. PATENT DOCUMENTS

| | | | |
|---|---|---|---|
| 2005/0159915 A1* | 7/2005 | Schaumann et al. | 702/130 |
| 2007/0288103 A1 | 12/2007 | Choudhury et al. | |
| 2009/0235670 A1* | 9/2009 | Rostek et al. | 60/785 |
| 2009/0315726 A1* | 12/2009 | Popp et al. | 340/584 |
| 2012/0009568 A1* | 1/2012 | Guilbeau | 435/6.1 |
| 2012/0031517 A1* | 2/2012 | Yoshida et al. | 138/103 |
| 2012/0287960 A1* | 11/2012 | Thompson et al. | 374/4 |

OTHER PUBLICATIONS

Sharif, Mohamed A., et al., "Fault Diagnosis in Industrial Control Valves and Actuators," IEEE Instrumentation and Measurement Technology Conference, St. Paul, Minnesota, USA (May 18-21, 1998).

Wikipedia, "Mahalanobis distance," http://en.wikipedia.org/wiki/Mahalanobis_distance (Dec. 2008).

Ruel, Michel, "Stiction: The Hidden Menace," Control Magazine (Nov. 2000).

* cited by examiner

EXEMPLARY ILLUSTRATIVE
AIRCRAFT GAS TURBINE ENGINE
INCLUDING BLEED AIR SYSTEM

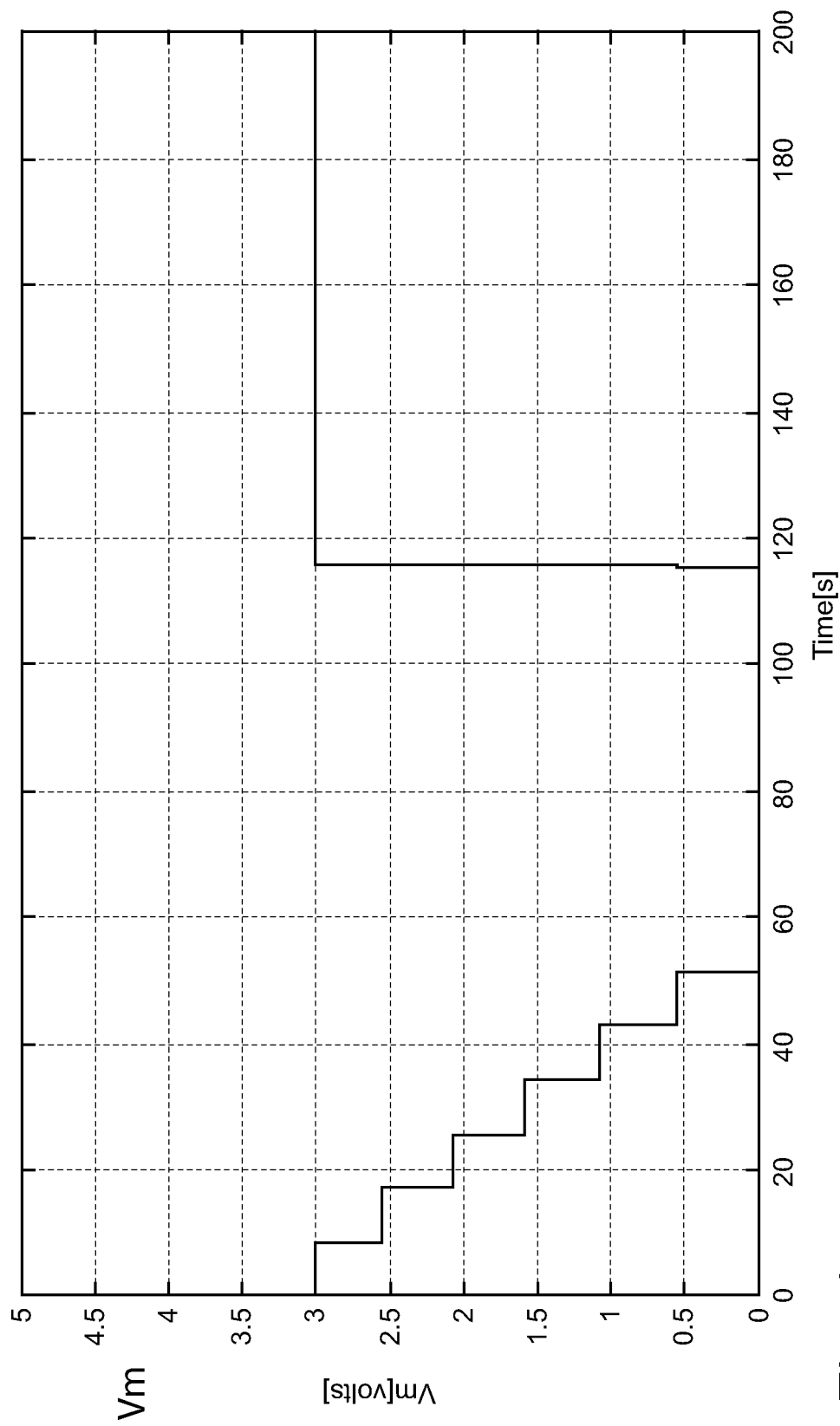
Fig. 4 Example IBIT Sequence - No Failure

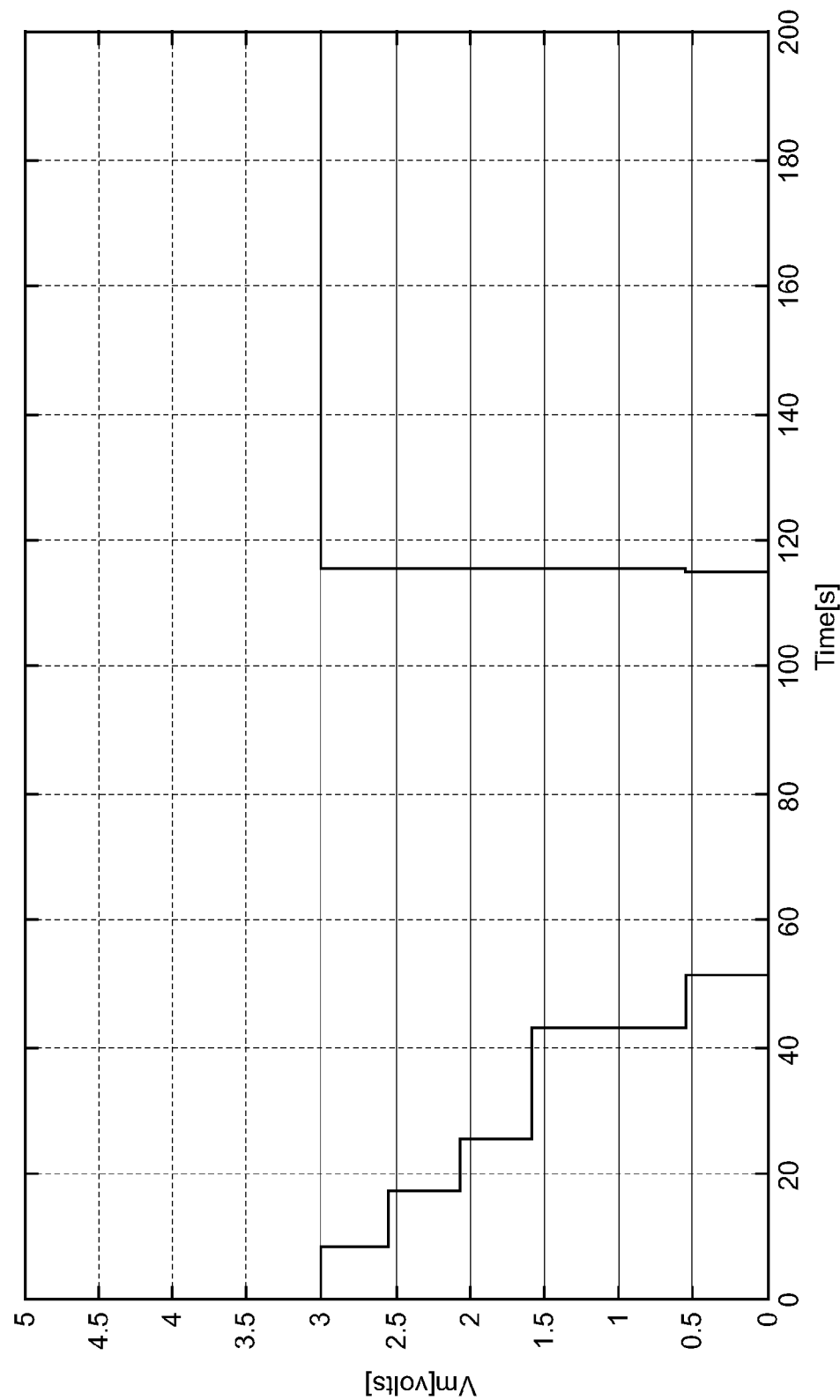
Fig. 5  Example IBIT Sequence In Which Thermostat Switch A Fails

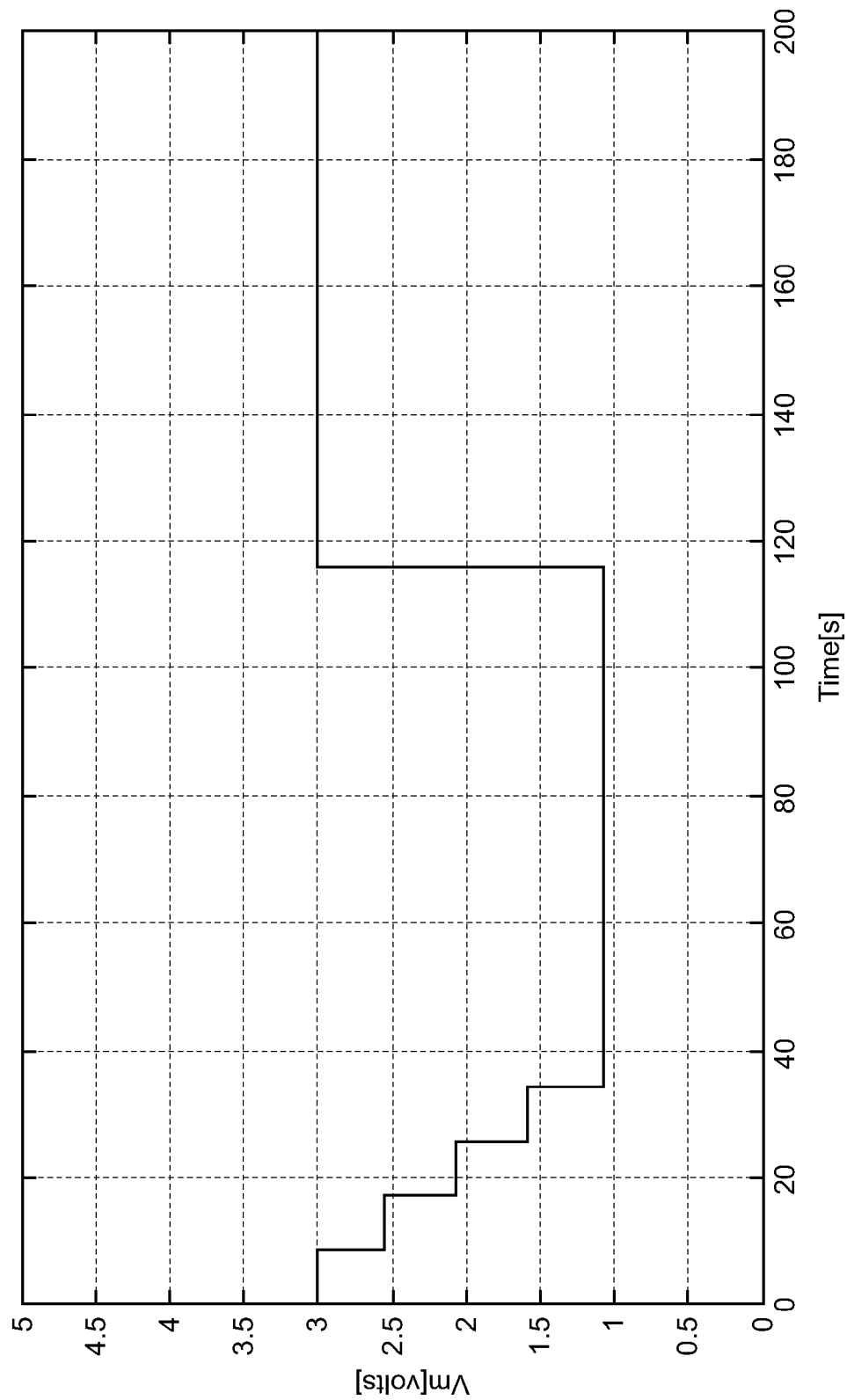
Fig. 6  Example IBIT Sequence In Which Thermostat Switch B Or Thermostat Heater Fails

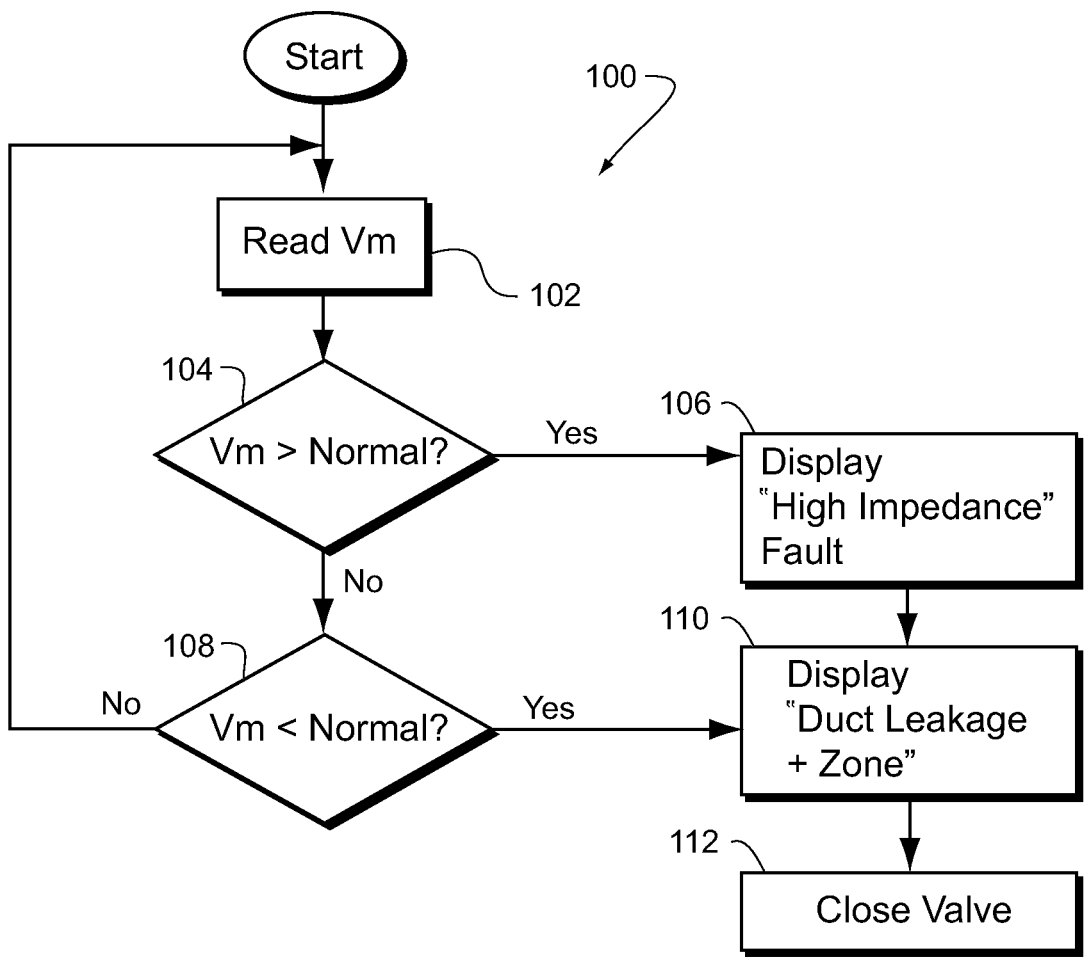
Fig. 7A  Example Flowchart - Operation

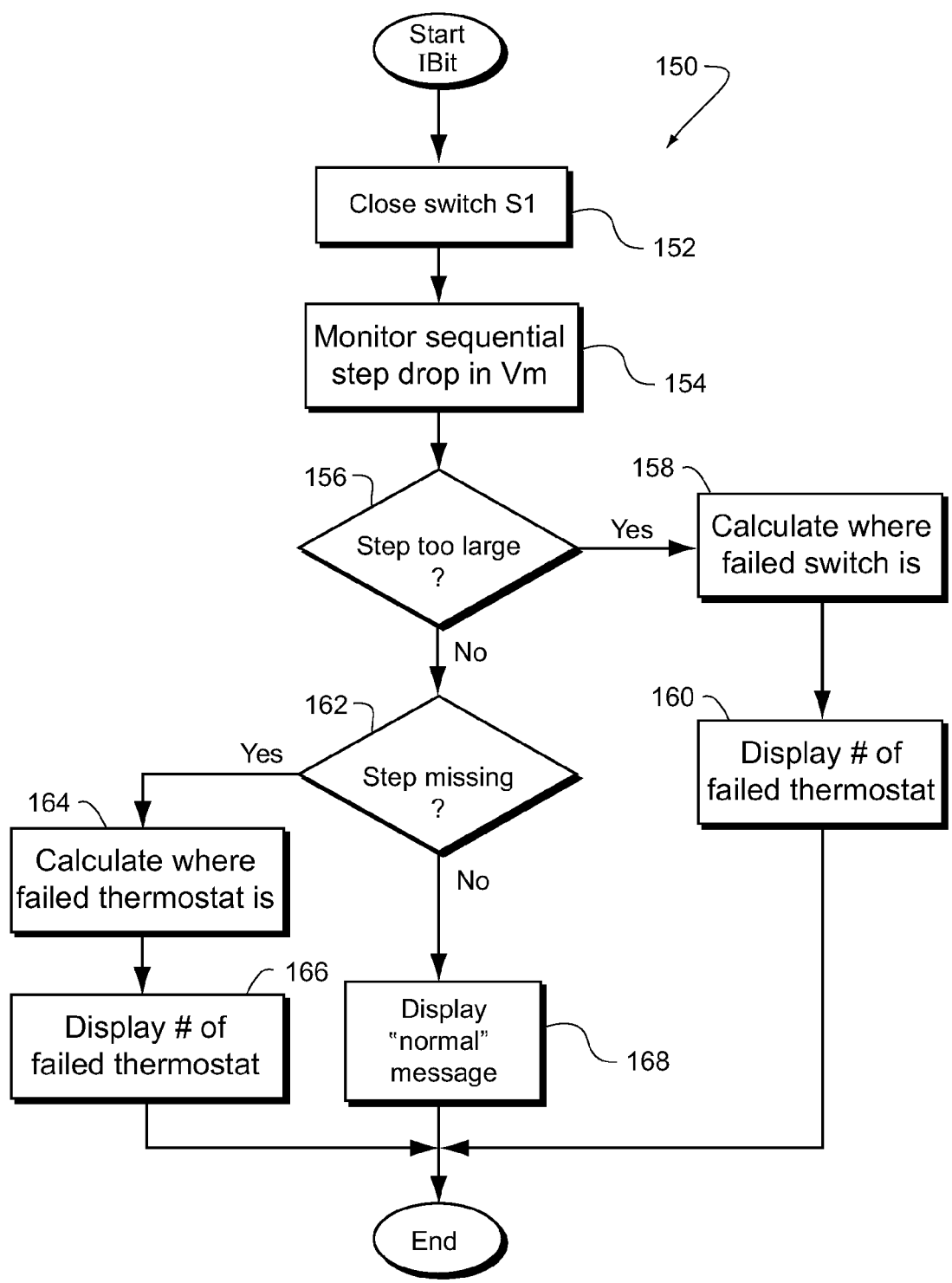
Fig. 7B  Example IBit Flowchart

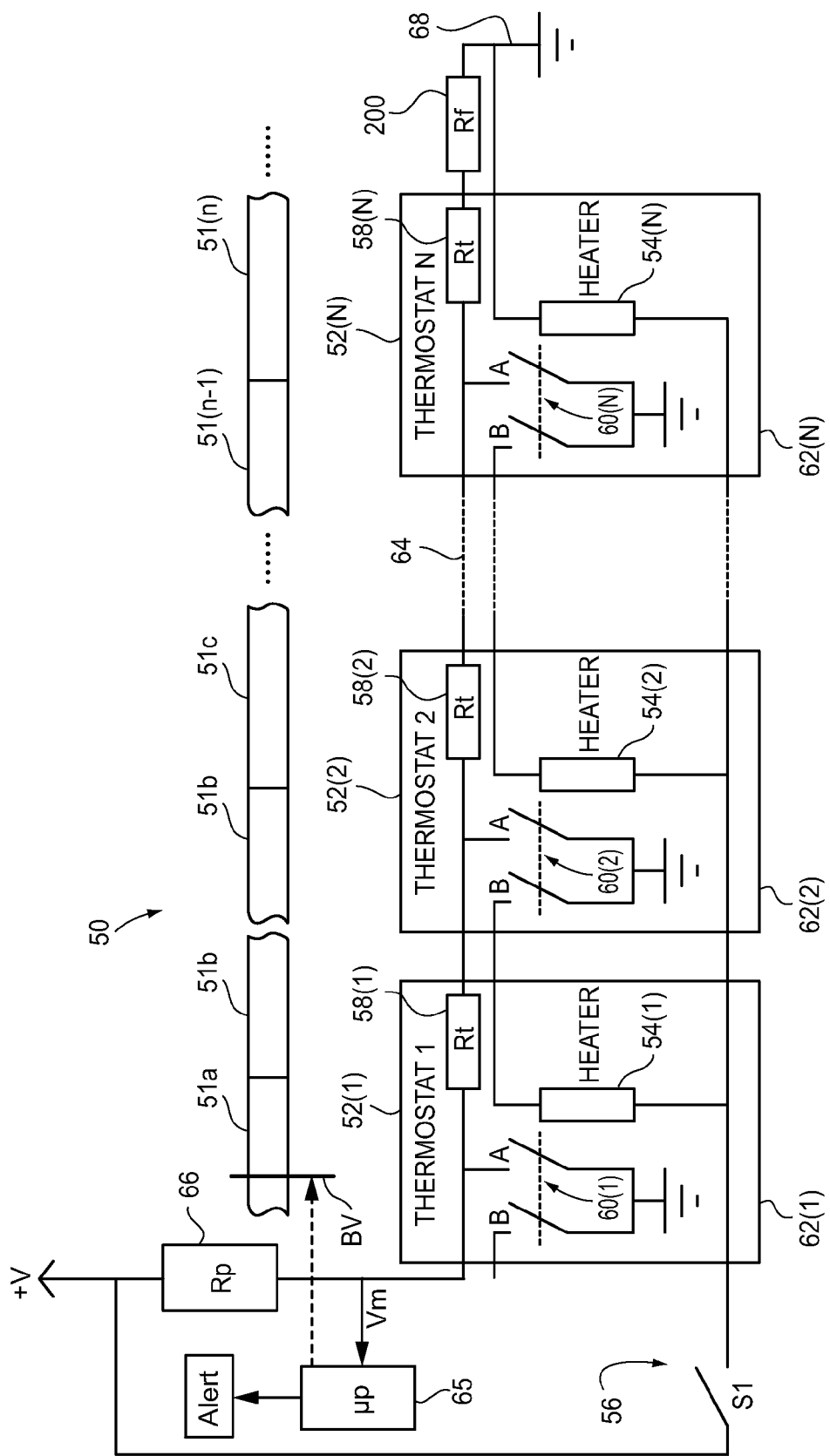
Fig. 8  Example Second Embodiment

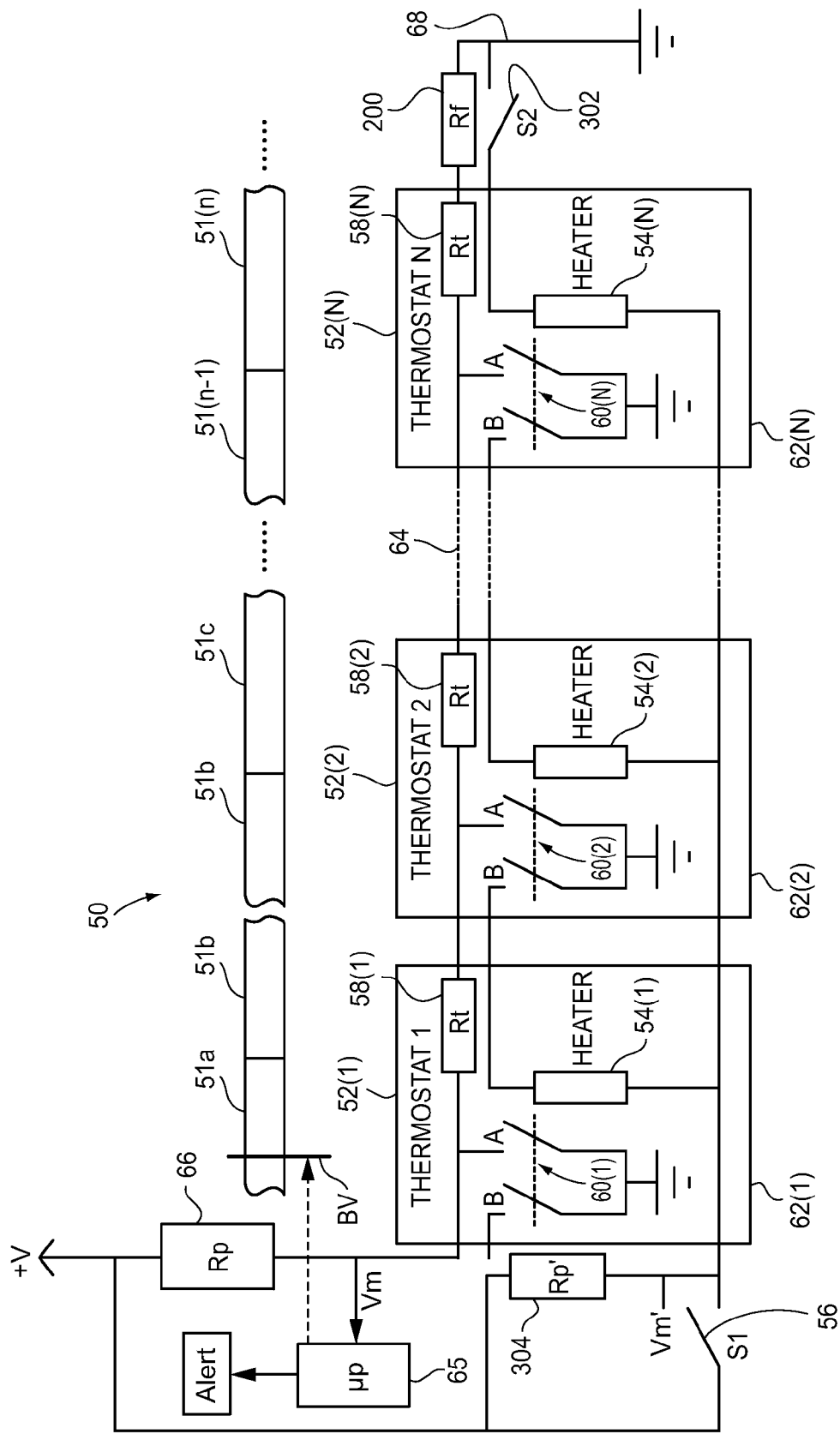
Fig. 9  Example Third Embodiment

BLEED LEAKAGE DETECTION SYSTEM AND METHOD

CROSS-REFERENCES TO RELATED APPLICATIONS

This application is related to commonly assigned copending U.S. patent application Ser. No. 12/023,585 filed Jan. 31, 2008, entitled "Bleed Airflow Balancing Control Using Simplified Sensing".

STATEMENT REGARDING FEDERALLY SPONSORED RESEARCH OR DEVELOPMENT

FIELD

The technology herein relates to pneumatic system testing and failure detection, and more particularly to aircraft pneumatic systems where engine bleed provides pressurized hot air to air bleed ducts. The technology herein further relates to gas turbine aircraft engines and aircraft engine airflow control, and to bleed airflow leakage detection.

BACKGROUND AND SUMMARY

As shown in FIG. 1, gas turbine engines 10 of the type commonly found on many aircraft include a compressor 20, a combuster 30 and a turbine 40. The compressor 20 compresses air which is then mixed with fuel for combustor 30 to ignite. The combustor 30 exhausts gases which turn the vanes of the turbine(s) 40. Power from the rotating turbine 40 operates the compressor 20.

Turbine engine compressors can be designed to supply more compressed heated air than is needed to operate the engine 10. This additional compressed air from the compressor 20 can be used for tasks other than feeding the combustor 30. For example, it is common to bleed some of the compressed air from the compressor 20 and route the bleed air to other equipment onboard the aircraft such as de-icers, cabin pressurization systems and the like.

While it is highly useful to bleed hot air from the gas turbine engines for use for other purposes, it is also important to ensure that the operation of the engines is not compromised in any way as a result of the bleed air system. If the bleed air system develops a leak, hot air bled away from the engines could escape and damage the aircraft structure. Alternatively, leakage of hot air from the bleed air duct onto other sensitive components nearby could damage those other components. Because aircraft are constantly in motion and are subjected to stresses and strains from landings, takeoffs and in flight turbulence, it is desirable to monitor the condition of bleed air ducts to ensure that no leakage is occurring.

One common way to detect leakage from a bleed air duct is by monitoring the temperature on or near the duct. Thus, some aircraft include bleed leakage detection systems to detect when leakage from the bleed air system occurs. Because the bleed air is heated by the gas turbine engines, it is common to use temperature sensing to detect bleed air leakage.

Various types of temperature sensors including thermal switches have been used in the past. A common form of thermal switch is the simple thermostat of the type that controls central heating in many homes throughout the world. Such a thermal switch consists of two metal strips having different thermal expansion coefficients. Such well known bimetallic strips flex or bend in response to temperature changes. When temperature exceeds a predetermined level, thermal expansion between the two different metals provides enough bending force to cause the bimetal strip to move close electrical contacts. Such thermal switches are highly reliable and can be used in bleed air leakage detection systems.

For example, it is possible to install thermostats near each point where the bleed air duct is joined with another section of duct work. If leakage develops, the air surrounding the ductwork joint increases in temperature and the resulting heating provides sufficient energy to actuate the thermostatic thermal switch.

One type of prior art bleed leakage detection system is referred to as the "Overheat Detection System" ("ODS"). In such system, a cable externally installed in parallel with the bleed duct includes two resistive wires that are immersed in a special salt solution. When leakage occurs, the temperature outside the duct rises and the heating causes the equivalent conductance between the two wires to decrease significantly. This change in conductance is detected by electronics (e.g., a microprocessor) which closes the bleed valve and provides a "duct leakage" message to the pilot's control panel. Because the equivalent conductance depends on the length of the cable, this Overheat Detection System is able to detect the exact place where the leakage is occurring. Unfortunately, the Overheat Detection System is a relatively expensive and complex system.

Another known prior art overheat detection system uses sensors to detect breaks in the duct-work of the bleed system. The sensors comprise surface sensors consisting of cylindrical wires a few millimeters thick that contain, between the core and sheath, a filling that has a temperature-dependent electrical resistance. Below a certain response temperature (which can be set within certain limits during production), the resistance is high. If the temperature exceeds a predetermined temperature, the sensor resistance abruptly decreases by several orders of magnitude. Such a change in resistance can be electronically detected by a monitoring device. If hot air emerges from the pipeworks system through a leak, the hot air heats the surrounding sensors until the sensors exceed the predetermined response temperature. The monitoring system detects a leak and responds to the abrupt change in resistance. Additional electronics in the monitoring system is able to control elements that interrupt the air supply in the leaking section by for example closing a shutoff valve.

A further know prior art arrangement uses a thermal switch connected in series with the shutoff valve and also includes a monitoring control device. The thermal switch interrupts the shutoff circuit whenever a predetermined limit temperature within the bleed air duct has been exceeded. The thermal switch prevents possible overheating relating to the temperature within the bleed duct.

Thus, a variety of different thermostat designs have been developed and optimized in an attempt to improve bleed leakage detection reliability and low cost. A technical challenge is to attain an acceptable level of reliability. Although the commonly available thermostatic thermal switch is considered to be highly reliable, the ratio between the thermostat failure rate and duct leakage failure rate may still remain significant. Therefore, the probability is not negligible that a thermostat used to detect bleed air duct failure may have latently failed by the time duct leakage occurs. A thermostat latently fails when it has failed but its failure has not yet been detected.

It would be desirable to provide a bleed air leakage detection approach that provides highly reliable thermostat implementations and yet also minimizes latent thermostatic failures.

The exemplary illustrative non-limiting technology herein provides a bleed leakage detection system including an arrangement of series-connected, disparately placed thermostats. The bleed leakage detection system is capable of detecting the exact place where the bleed air leakage is occurring (e.g., the precise failed junction in bleed air duct work) by detecting which thermostat has opened. Such detection can be accomplished by monitoring voltage or current on a line that connects the thermostats in series with respective resistances. The exemplary illustrative non-limiting implementation also provides a sequential bleed leakage detection system thermostat self-test function ("Initiated Built In Test"—"IBIT") which allows continuous monitoring of thermostat sensor wiring during flight. The pilot is alerted when the bleed leakage detection system has failed so that appropriate countermeasures and maintenance may be performed.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 4 shows signals monitored from the FIG. 2 circuit during normal operation in which no thermostat has failed;

FIG. 5 shows exemplary illustrative non-limiting signal sequences indicating that a first thermostat switch A has failed;

FIG. 6 shows exemplary illustrative non-limiting signaling occurring when a second thermostat switch B or thermostat heater fails;

FIGS. 7A and 7B show an exemplary illustrative non-limiting software-controlled algorithms for analyzing signals obtained from the FIG. 2 circuit;

FIG. 8 shows an additional exemplary illustrative non-limiting bleed leakage detection system electrical schematic diagram; and FIG. 9 shows an additional exemplary illustrative non-limiting bleed leakage detection system electrical schematic diagram.

DETAILED DESCRIPTION

Figure 1:
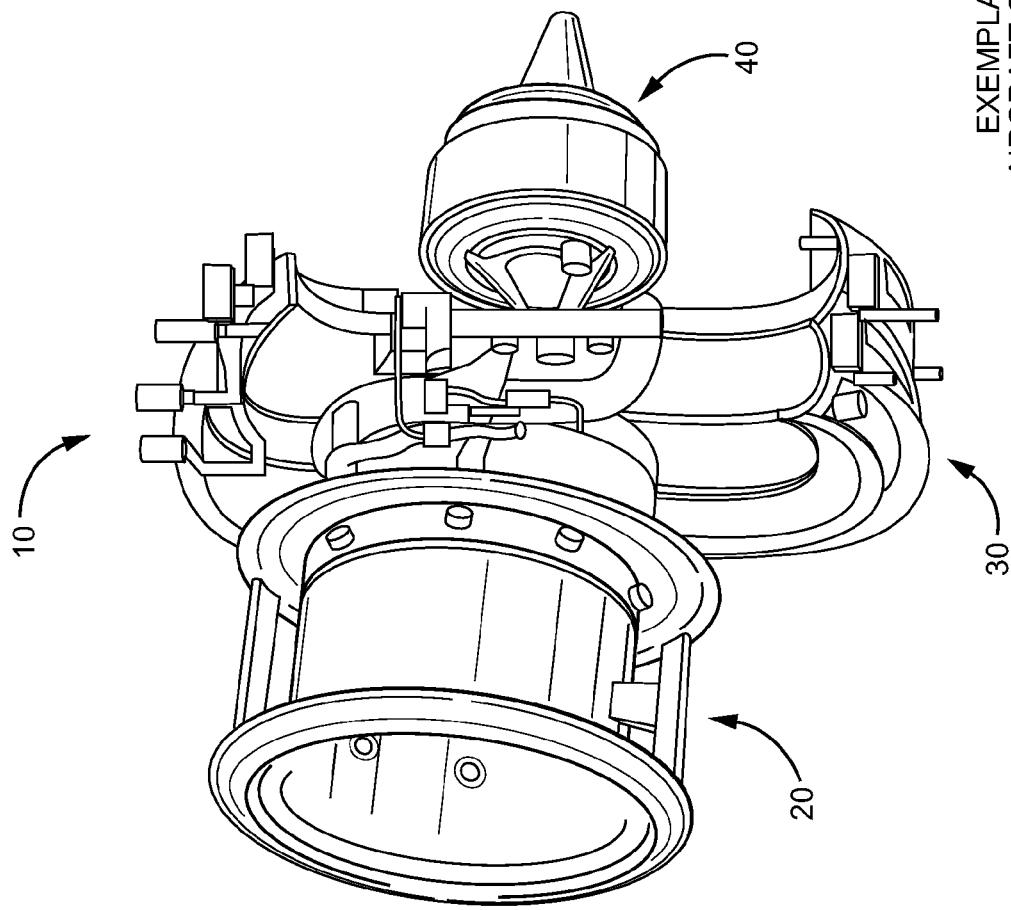
FIG. 1 shows an exemplary illustrative aircraft gas turbine engine.
Figure 2:
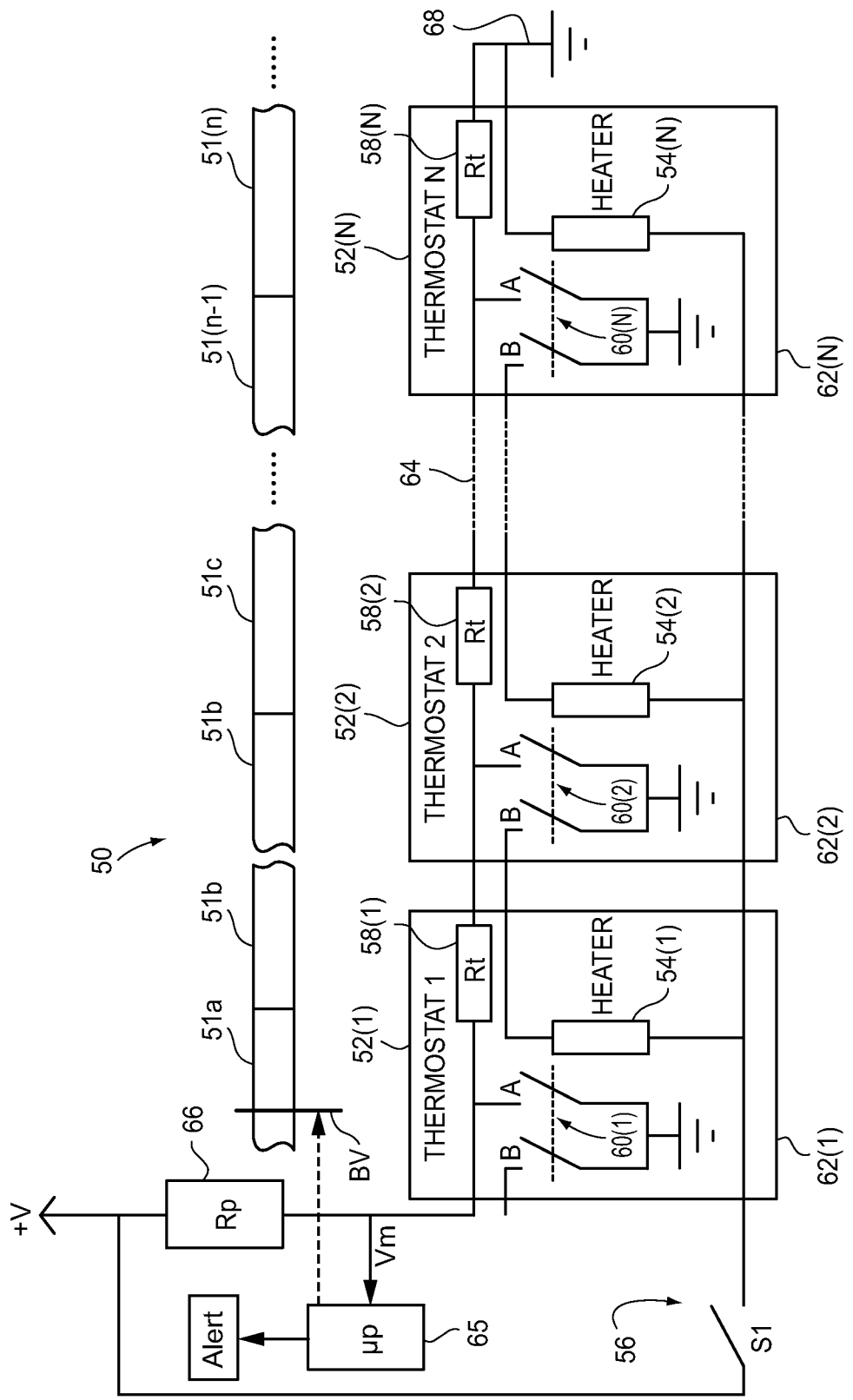
FIG. 2 shows an exemplary illustrative non-limiting bleed leakage detection system electrical schematic diagram.

FIG. 2 shows an exemplary illustrative non-limiting thermostat leakage detection system 50. System 50 includes a plurality of thermostats 52(1), 52(2), 52(N). Each of thermostats 52 may be installed for example near a junction between two pieces of joined bleed air duct work 51 that route bleed air, and are preferably installed outside of the duct.

In order to minimize the amount of time that occurs before latent failure of thermostats 52 is detected, system 50 continuously monitors, via electrical wiring that connects the various thermostats, the condition of each of the thermostats. This continuous electrical wiring monitoring may be performed for example by analog electronic circuit, a digital circuit, and/or by software that may be implemented and executed on a microprocessor 65.

In addition, a self-test function (Initiated Built In Test—IBIT) is implemented using thermostat self-heating. In the exemplary illustrative non-limiting implementation, small heaters are installed within each thermostat case. The heaters may be activated by a switch 56. The heaters, when activated, cause the thermostats 52 to switch. Such switching can be detected to verify that each of thermostats 52 is operating correctly. The IBIT self-testing can be initiated before the aircraft takes off or optionally, during periodic self testing that may be run during predetermined periods such as overnight when the aircraft is not being flown. FIGS. 4-6 show example signals obtained from an exemplary illustrative non-limiting IBIT self-testing operation, and 7B shows an exemplary illustrative non-limiting software-controlled IBIT self-testing algorithm.

An additional feature provided by the exemplary illustrative non-limiting arrangement shown in FIG. 2 is to identify the leakage zone using minimal hardware and associated weight and cost. For this purpose, a small resistor $R_t$ 58 is included within each of the various thermostats. This additional resistor 58 provides a specific known voltage drop that is related to the leakage zone. A microprocessor monitoring the voltage drop seen at one end of the connection can identify exactly which thermostat has switched in response to detected temperature increase.

The exemplary illustrative non-limiting implementation may use software to detect and localize the leakage zone. An exemplary software algorithm (see FIG. 7A) may check the voltage variation that is caused by the thermostat actuation. This voltage variation may be used to detect and localize the leakage zone.

Figure 3:
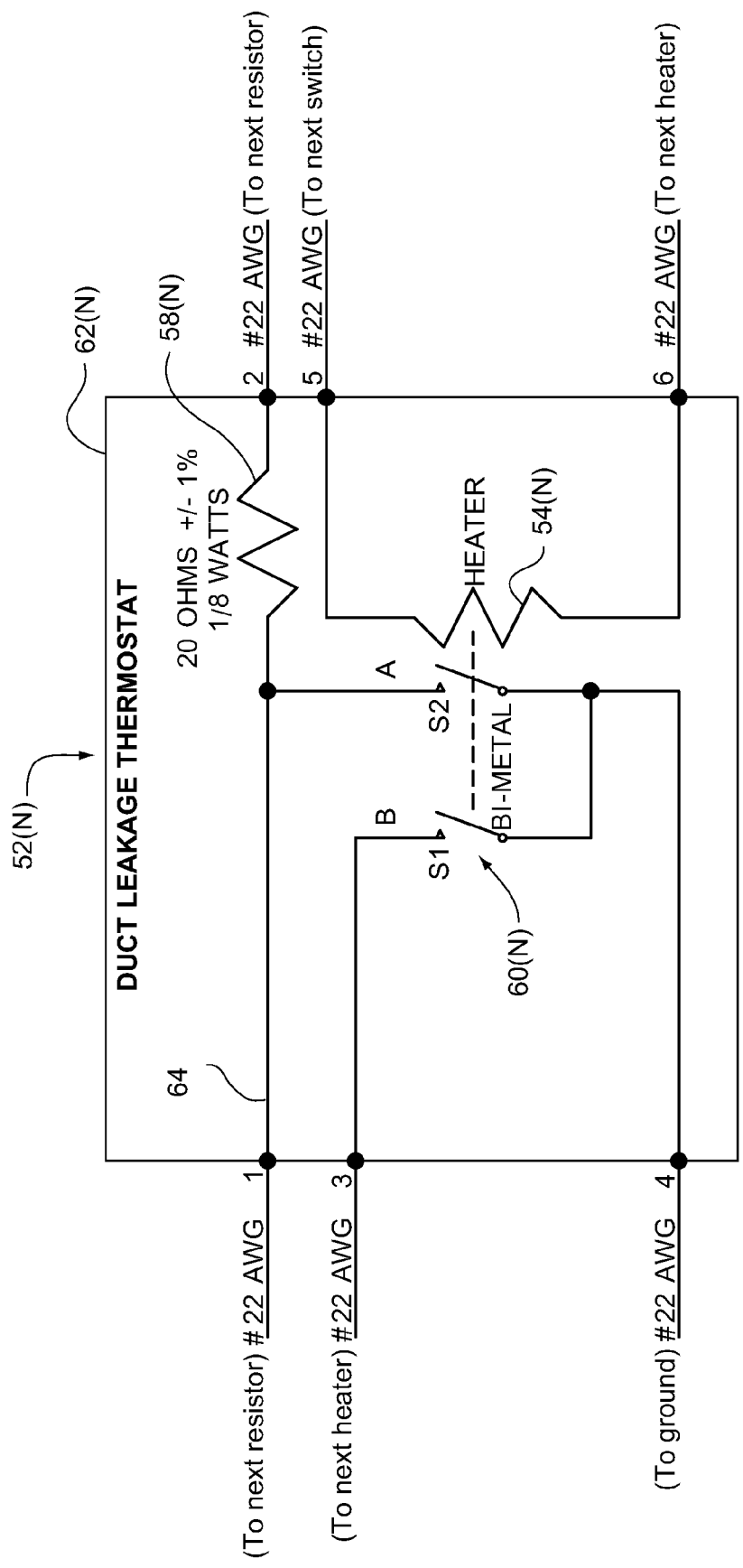
FIG. 3 shows an exemplary illustrative non-limiting more detailed schematic diagram of an exemplary thermostat used in the FIG. 2 system.

In more detail, referring to FIGS. 2 and 3, each of thermostats 52 comprises a bi-metal thermostatic switch 60 that is normally open but which closes when ambient temperature exceeds a predetermined level. In the exemplary illustrative non-limiting implementation shown, each of thermostatic switches 60 has two poles (A and B) and comprises a double pole single throw (DPST) switch. One of the poles (A) of each thermostat switch 60 is used to ground a sense line 64 in response to high ambient temperature detection. Thus, when the thermostat 52 is not exposed to high ambient temperature, the bi-metal switch 60 A contacts remain open and sense line 64 is not connected to ground by means of one thermostat 52. On the other hand, when the thermostat 52 is exposed to high ambient temperature (e.g., in the event of a bleed air duct leak), the bi-metal switch 60 contacts close so that the A pole of the switch shunts the sense line 64 to ground.

Each thermostat includes, within its housing 62, a resistor 58 of known value (e.g., 20 ohms±1%). The resistors 58(1) ... 58(N) are connected in series by the sense line 64. The equivalent resistance (Requivalent) provided by resistors 58 on sense line 64 is additive (Requivalent=R1+R2+...RN). By measuring the resistance (or the voltage drop across the sense line or the current flowing on the sense line), it is possible to determine the first thermostat 52 in the series connection (i.e., the one closest to the microprocessor 65) whose switch 60 has closed.

In most cases, only one thermostat 52 is likely to detect high ambient temperature at a time, but even if multiple ones function properly to detect abnormal heat escaping from the bleed air duct, the system can automatically isolate the duct junction closest to the engine that has failed and take appropriate corrective action (e.g., actuate an air shutoff valve to prevent further hot air from escaping).

The other pole B of each thermostat switch 60 is used to actuate the heater element 54 of the next thermostat 52 which is connected to the switch. For example, the B pole of the thermostat switch 60(2) closes providing electrical power to the heater element 54(1) of the thermostat 52(1). Similarly, the switch pole B of the thermostat switch 60(3) is connected to supply current to the heater 54(2) of the thermostat 52(2), and the pole B of the thermostat switch 60(N) is used to supply current to the heater 54(N−1) of thermostat 52(N−1). The very last heater 54(N) of the last thermostat 52(N) is connected directly between ground 68 and switch 56 in this particular embodiment.

When switch 56 closes, current is applied to this heater 54(N) which heats up sufficiently to cause switch 60(N) to close. However, switch 60(N) does not close instantly. Rather, there is a certain amount of time required once heater 54(N) has current supplied to it for the heater to heat up the thermostat 52(N) sufficiently to cause thermostat 60(N) to close.

When switch 60(N) closes, it delivers current to the heater 54(N−1) (of the next thermostat connected in series). That heater 54(N−1) in turn heats its associated switch 60(N−1)— which after a certain time period has passed, in turn closes to supply current to the next heater down the line.

This process continues until heater 54(2) is actuated by closure of thermostat switch 60(3). The heater 54(2) in turn heats thermostat switch 60(2) so that it closes, and causes current to be delivered to heater 54(1). When heater 54(1) finally is actuated, it will, in turn, heat thermostat switch 60(1) sufficiently to close that switch and—if the system is functioning normally—thus cause all switches 60(N)-60(1) to close in sequence. Such closures can be detected by a microprocessor 65 that monitors the resistance or voltage on the series-connected sense line 64. See FIGS. 4-6 and 7B for example.

In more detail, the current flowing over the series-connected sense line 64 may be calculated as:

$$I=V/[R_p+N*R_t] \quad (1)$$

where $R_p$ 66 is a pull-up resistor, $R_t$ 58 is an internal thermostat resistor and N is the total number of thermostats 52 connected in series.

When a leakage is detected, the current flowing over sense line 64 may be calculated as:

$$I=V/[R_p+N_{bl}*R_t] \quad 1(a)$$

where $N_{bl}$ is the number (i.e., quantity) of thermostats positioned before the leakage zone. For example, if leakage occurs in the zone where thermostat 52(5) is installed, then $N_{bl}$=4. If the leakage occurs in the zone where thermostat 52(4) is installed, then $N_{bl}$=3. $N_{bl}$ is the number of thermostats whose resistances $R_t$ 58 are in series in the electrical circuit formed when a thermostat switch 60 closes due to a detected leakage in its zone. In the equation 1(a), $[R_p+N_{bl}*R_t]$ is the equivalent resistance in the electrical circuit. Therefore, the monitored voltage $V_m$ can be calculated by:

$$V_m=V*N_{bl}*R_t/[R_p+N_{bl}*R_t] \quad (2)$$

if $V_m$ is known, then $N_{bl}$ my be calculated by:

$$N_{bl}=V_m*R_p/[R_t*(V-V_m)] \quad (3)$$

Thus, the leakage zone can be identified by the following equation:

$$N_{lz}=N_{bl}+1 \quad (4)$$

where $N_{lz}$ is the number (i.e., position number) of the thermostat installed in the leakage zone. From the number of the thermostat 52, it is possible to identify the leakage zone.

Under normal operation $N_{bl}$=N. Therefore, the monitored voltage can be calculated as:

$$V_m=V*N*Rt/[Rp+N*Rt] \quad (5)$$

If $V_m$ exceeds the specified limit, then continuous monitoring software may provide a high impedance failure message such as "leakage detection system failure." When this message is displayed, it means that the leakage detection system is not operating correctly but instead has failed. For example, breaking of a sense wire 64 or a poor connection between the different thermostats 52 can result in a high impedance failure.

If $V_m$, as monitored by microprocessor 65, drops below a specified limit (see FIG. 7A), then the continuous monitoring software may provide a "duct leakage" failure message. In this case, using equations 3 and 4, the software can localize precisely the leakage zone. Besides the "duct leakage" message, the system 50 may also provide immediate automatic closing of a bleed valve BV. In other applications, the system need not take such immediate curative action but may simply display the failure mode on an operator display or report it automatically to maintenance personnel.

Thus, through monitoring the voltage, microprocessor 65 may detect two different types of failures: (1) bleed air leakage, and (2) wiring short circuit in the bleed air detection system 50. For these two cases, the system 50 provides messages, as for example, shown in FIG. 7A.

The condition of each thermostat 52 itself cannot detect by the continuous monitoring function because the continuous monitoring function only detects the wiring short circuit, wiring opened circuit and bleed air leakage as described above. Therefore, in the exemplary illustrative non-limiting implementation, an "Initiated Built In Test" (IBIT) or periodic test is provided to test the condition of each of thermostats 52. The test may be initialized by mechanical switch when electrically actuated switch 56 is closed (see FIG. 7B). The switch 56 may be replaced by automatic function that may be implemented in the microprocessor software.

When switch 56 is closed, it provides electrical power to energize sequentially all of the thermostat heaters 54. The heating sequence starts in thermostat 52(N) and continues down the line with each thermostat 52 in sequence until heater 54(1) is actuated. After some time has passed, all thermostats will be actuated and the last monitored voltage $V_m$ should be in the example shown in FIG. 2, approximately zero volts. The amount of time required to complete this sequence of switch closures depends upon the heating power of each heater 50, thermostat thermal inertia, thermostat thermal conduction, thermostat quantity and possible other factors.

FIG. 4 shows an example IBIT sequence when there is no failure and six thermostats connected in series are operating normally. It can be observed that each constant amplitude step drop in $V_m$ corresponds to an actuation of one of thermostats 52. When the test finishes, switch 56 is opened and the voltage $V_m$ returns to its initial value.

FIG. 5 shows the behavior of $V_m$ when a thermostat switch 60 A contacts fails during the IBIT self test. In this case, the microprocessor 65 identifies the abnormal step amplitude and localizes the failed thermostat 52 using the following equations that are derived from equation number 2.

$$V_{ma}=V*N_{ba}*R_t/[R_p+N_{ba}*R_t] \quad (6)$$

In this case, $V_{ma}$ is the monitored voltage during the abnormal step amplitude (see FIG. 5), V is the supply voltage, Nba is the number (i.e., quantity) of thermostats 52 whose $R_t$ resistance 58 values are in series in the electrical circuit when the system is converging to $V_{ma}$ (i.e., when the abnormal step amplitude is occurring). $N_{ba}$ is the number of thermostats that are connected in series before the last thermostat that worked correctly when the abnormal step occurred. $R_t$ is the value of the internal thermostat resistors 58, and $R_p$ is the value of pull-up resistor 66.

Since $V_{ma}$ is known, $N_{ba}$ may be calculated by:

$$N_{ba}=V_{ma}*R_p/[R_t*(V-V_{ma})] \quad (7)$$

Thus, $N_{ba}$ also represents the number (i.e., position number) of the thermostat 52 whose switch 60A contacts failed. When the self-test is finished, the system 50 provides a message indicating the position number of the thermostat whose switch A has failed.

FIG. 6 shows the behavior of $V_m$ when a thermostat switch 60B contacts and/or a heater 54 fails during the IBIT self-test. In this example, $V_m$ never drops to a minimum value. The software running on microprocessor 65 may localize the failed thermostat 52 by using the following equation:

$$V_{lm} = V * N_t * R_t / [R_p + N_t * R_t] \qquad (8)$$

where $V_{lm}$ is the last monitored voltage during the test, V is the supplied voltage, $N_t$ is the number (i.e., quantity) of thermostats 52 whose $R_t$ resistor values 58 are in series in the electrical circuit when the system is converging on $V_{lm}$, $R_t$ is the internal thermostat resistor 58, and $R_p$ is the pull-up resistor 66.

As $V_{lm}$ is known, $N_t$ may be calculated by:

$$N_t = V_{lm} * R_p / [R_t * (V - V_{lm})] \qquad (9)$$

Thus, if a heater fails, $N_t$ represents the number (position number) of the thermostat 52 whose heater failed. If a switch B contact fails, the sum $(N_t+1)$ represents the number (position number) of the thermostat 52 whose switch B contacts failed. As the system 50 does not differentiate these two situations, when the self-test is finished, the system 50 provides a message indicating the position numbers of the two thermostats corresponding to $N_t$ and the sum $(N_t+1)$.

If a large number of thermostats 52 are connected in series, the resulting large number of series resistors 58 may cause too small an amount of voltage variation on $V_m$ (e.g., mainly when the last thermostat 52(N) was actuated). In order to reduce the component drift susceptibility and consequently improve leakage detection reliability, FIG. 8 provides an additional resistor $R_f$ 200 may be provided. The above equations should be modified in order to consider this additional resistance $R_f$ 200.

FIG. 9 shows an additional exemplary illustrative non-limiting implementation that duplicates leakage detection reliability by continually monitoring the state of switch 60 contacts B as well as electrical contacts A. In the FIG. 9 example, the IBIT wiring is used to perform this additional function. Reliability can be almost duplicated because two voltages are continuously monitored: $V_m$ and $V_{m'}$ where $V_{m'}$ is the voltage at an additional pull-up resistor $R_{p'}$ 304. Assuming $R_{p'}$ 304 has high impedance, $V_{m'}$ will trend toward a minimum voltage when any thermostat 52 is actuated. During normal operation, switch 302 is open to provide continuous monitoring. In order to provide the self-test IBIT function, switch 302 and switch 56 are closed.

The exemplary illustrative non-limiting implementations described above may have their monitoring functions implemented with discrete analog electronic components or with a microprocessor. For example, one type of suitable microprocessor may be a microcontroller including an internal analog-to-digital converter that converts the analog level of $V_m$ ($V_{m'}$) to a digital value for testing and monitoring. In another exemplary illustrative non-limiting implementation, it is possible to implement the arrangements described above using common thermostats which do not have any internal resistor. In this case, the resistor $R_t$ may be implemented in the wiring between the thermostats as opposed to within them. Optionally, the described heaters 54 may be provided externally or attached to the thermostat cases 62 so that conventional off the shelf thermostats 52 can be used. In accordance with another exemplary illustrative non-limiting implementation, it is possible to implement the above arrangement using negative temperature coefficients resistors (NTC thermistors). In such an implementation, the above-mentioned thermal switches A and B may be replaced by NTC thermistors.

While the technology herein has been described in connection with exemplary illustrative non-limiting implementations, the invention is not to be limited by the disclosure. For example, while the technology herein has been described as being useful to monitor a bleed air system for failure, a variety of other temperature monitoring applications are also possible. The invention is intended to be defined by the claims and to cover all corresponding and equivalent arrangements whether or not specifically disclosed herein.

I claim:

1. A method of detecting bleed air leakage onboard an aircraft comprising:
   measuring voltage or current associated with a plurality of disparately-located temperature-sensitive elements connected in electrical series, each of said temperature-sensitive elements having an electrical resistance associated therewith, the plurality of disparately-located temperature-sensitive elements comprising a first series-connected temperature sensitive element and a second series-connected temperature-sensitive element, the first series-connected temperature-sensitive element having a first test heater located in proximity thereto;
   upon being heated by the first test heater, said first series-connected temperature-sensitive element selectively activating, after a delay time sufficient to test responsivity of the first temperature-sensitive element to heating by the first test heater, a second test heater located in proximity to the second series-connected temperature-sensitive element;
   detecting bleed air leakage by analyzing said measured voltage or current to determine whether at least one of said temperature-sensitive elements has indicated abnormally high temperature; and
   conditioned on said analysis, selectively providing an alert and/or operating a shutoff valve to at least reduce further bleed air leakage.

2. The method of claim 1 further including displaying a warning indication in response to detection of bleed air leakage.

3. The method of claim 1 further including detecting, in response to said analysis, whether said series-connected temperature-sensitive elements have abnormally open-circuited.

4. The method of claim 1 further including intentionally heating each of said temperature-sensitive elements and detecting responsive voltage or current changes to verify that said elements are operating properly.

5. The method of claim 1, wherein at least some of said temperature-sensitive elements upon being heated, operate to electrically actuate said heating devices associated with different ones of said temperature-sensitive elements.

6. The method of claim 1 further including using the heating of a sequence of at least some of said temperature-sensitive elements to analyze said voltage or current to confirm proper operation thereof.

7. The method of claim 1 wherein said temperature-sensitive elements comprise bi-metallic switching elements.

8. The method of claim 1 wherein said temperature-sensitive elements comprise thermistors.

9. The method of claim 1 wherein the first series-connected temperature-sensitive element includes a thermostatic test heater actuator.

10. The method of claim 1 wherein each of said temperature-sensitive elements has a different test heater associated therewith, the first test heater associated with the first temperature-sensitive element being operative to heat the first temperature-sensitive-element said first temperature-sensitive element being connected to supply current, after a delay time sufficient to test the first temperature-sensitive element's response to the heat, to the second test heater associated with the second temperature-sensitive element.

11. A system for detecting bleed air leakage onboard an aircraft comprising:
 a plurality of disparately-located temperature-sensitive devices electrically connected in series, at least some of the devices disposed at or near bleed air ducts, each of said temperature-sensitive devices having an electrical resistance associated therewith;
 an electrical measuring circuit connected to said series-connected disparately-located plurality of temperature-sensitive devices, said measuring circuit being configured to measure the voltage or current associated with said plurality of disparately-located temperature-sensitive devices and analyzing said measured voltage or current to determine whether at least one of said devices indicates abnormally high temperature;
 at least one output device connected to said circuit, said output device changing state in response to detection that at least one of said devices indicates abnormally high temperature attributable to leakage of hot bleed air, and
 a plurality of testing heating devices co-located with said respective plurality of disparately-located temperature-sensitive devices, said testing heating devices generating heat in response to electrical current flowing therethrough, to expose said temperature-sensitive devices to test heating,
 a first of said series-connected temperature-sensitive devices having a first testing heating device located in proximity thereto, said first series-connected temperature-sensitive device being configured to, upon being heated by the first testing heating device, selectively activate, after a delay time sufficient to test responsivity of the first temperature-sensitive device to heating by the first testing heating device, a second test heating device located in proximity to a second of said series-connected temperature-sensitive devices different from said first temperature-sensitive device.

12. The system of claim 11 wherein said output device comprises an alert indicator.

13. The system of claim 11 wherein said output device comprises a shutoff valve that is operated in response to detection that at least one of said devices has actuated indicating abnormally high temperature, to prevent further bleed air leakage.

14. The system of claim 11 wherein said temperature-sensitive devices comprise temperature sensitive switches.

15. The system of claim 11 wherein said temperature-sensitive devices comprise thermistors.

* * * * *